US010699077B2

(12) United States Patent
Mehdad et al.

(10) Patent No.: US 10,699,077 B2
(45) Date of Patent: Jun. 30, 2020

(54) SCALABLE MULTILINGUAL NAMED-ENTITY RECOGNITION

(71) Applicant: Oath Inc., New York, NY (US)

(72) Inventors: Yashar Mehdad, San Jose, CA (US);
Aasish Pappu, New York, NY (US);
Amanda Stent, New York, NY (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 15/406,586

(22) Filed: Jan. 13, 2017

(65) Prior Publication Data
US 2018/0203843 A1    Jul. 19, 2018

(51) Int. Cl.
G06F 40/295 (2020.01)
G06F 16/9535 (2019.01)
G06F 40/30 (2020.01)

(52) U.S. Cl.
CPC ........ *G06F 40/295* (2020.01); *G06F 16/9535* (2019.01); *G06F 40/30* (2020.01)

(58) Field of Classification Search
None
See application file for complete search history.

(56) References Cited

U.S. PATENT DOCUMENTS

| | | | | |
|---|---|---|---|---|
| 8,694,305 B1* | 4/2014 | Grove | ...................... | G06F 40/40 704/9 |
| 9,190,055 B1* | 11/2015 | Kiss | ...................... | G06F 40/295 |
| 9,536,522 B1* | 1/2017 | Hall | ...................... | G10L 15/063 |
| 2015/0213361 A1* | 7/2015 | Gamon | .................. | G06N 20/00 706/12 |
| 2015/0363688 A1* | 12/2015 | Gao | ........................ | G06N 3/082 706/27 |
| 2016/0162468 A1* | 6/2016 | Erle | ...................... | G06F 40/284 704/9 |
| 2017/0278514 A1* | 9/2017 | Mathias | .................. | G10L 15/26 |
| 2018/0025121 A1* | 1/2018 | Fei | .......................... | G16H 50/50 705/3 |
| 2018/0060326 A1* | 3/2018 | Kuo | ........................ | G06Q 50/01 |
| 2018/0082197 A1* | 3/2018 | Aravamudan | ........... | G06N 5/04 |

OTHER PUBLICATIONS

Sardianos (Sardianos, Christos, Ioannis Manousos Katakis, Georgios Petasis, and Vangelis Karkaletsis. "Argument extraction from news." In Proceedings of the 2nd Workshop on Argumentation Mining, pp. 56-66. 2015.).*

(Continued)

*Primary Examiner* — Jonathan C Kim
(74) *Attorney, Agent, or Firm* — Cooper Legal Group, LLC

(57) ABSTRACT

Software on a website serves a user of an online content aggregation service a first article that the user views. The software extracts named entities from the first article using a named-entity recognizer. The named-entity recognizer uses a sequence of word embeddings as inputs to a conditional random field (CRF) tool to assign labels to each of the word embeddings. Each of the word embeddings is associated with a word in the first article and is trained using an entire topical article from a corpus of topical articles as a context for the word. The software then creates rankings for articles ingested by the content aggregation service based at least in part on the named entities and serves the user a second article using the rankings.

17 Claims, 10 Drawing Sheets

(56) References Cited

OTHER PUBLICATIONS

McCallum (McCallum, Andrew, and Wei Li. "Early results for named entity recognition with conditional random fields, feature induction and web-enhanced lexicons." In Proceedings of the seventh conference on Natural language learning at HLT-NAACL 2003—vol. 4, pp. 188-191. Association for Computational Linguistics, 2003.).*

Sardianos, Christos, Ioannis Manousos Katakis, Georgios Petasis, and Vangelis Karkaletsis. "Argument extraction from news." In Proceedings of the 2nd Workshop on Argumentation Mining, pp. 56-66. 2015. (Year: 2015).*

McCallum, Andrew, and Wei Li. "Early results for named entity recognition with conditional random fields, feature induction and web-enhanced lexicons." In Proceedings of the seventh conference on Natural language learning at HLT-NAACL 2003. (Year: 2003).*

Demir (Demir H, Özgür A. Improving named entity recognition for morphologically rich languages using word embeddings. In 2014 13th International Conference on Machine Learning and Applications Dec. 3, 2014 (pp. 117-122). IEEE.) (Year: 2014).*

* cited by examiner

A simple example of a symmetric word-word co-occurrence matrix:

|         | vector | meaning | hamster | corpus | weasel | animal |
|---------|--------|---------|---------|--------|--------|--------|
| vector  | 0      | 10      | 0       | 8      | 0      | 0      |
| meaning | 10     | 0       | 1       | 15     | 0      | 0      |
| hamster | 0      | 1       | 0       | 0      | 20     | 14     |
| corpus  | 8      | 15      | 0       | 0      | 0      | 2      |
| weasel  | 0      | 0       | 20      | 0      | 0      | 21     |
| animal  | 0      | 0       | 14      | 2      | 21     | 0      |

We produced meaningful representations in a completely unsupervised way!

BILOU Encoding

Justin Pierre James Trudeau is in Quebec City, the capital of Quebec.

B_PER I_PER I_PER L_PER O O B_LOC L_LOC O O O U_LOC O

| Tokens | IO | BIO | BMEWO | BMEWO+ |
|---|---|---|---|---|
| | | | | BOS_O |
| Yesterday | O | O | O | O |
| afternoon | O | O | O | O |
| , | O | O | O | O_PER |
| John | I_PER | B_PER | B_PER | B_PER |
| J | I_PER | I_PER | M_PER | M_PER |
| . | I_PER | I_PER | M_PER | M_PER |
| Smith | I_PER | I_PER | E_PER | E_PER |
| traveled | O | O | O | PER_O |
| to | O | O | O | O_LOC |
| Washington | L_LOC | B_LOC | W_LOC | W_LOC |
| . | O | O | O | O_EOS |

SCALABLE MULTILINGUAL NAMED-ENTITY RECOGNITION

BACKGROUND

Named entity recognition (NER) is a step in document understanding in many natural language processing (NLP) applications. Contextual, lexical, morphological, syntactic (e.g., part-of-speech (POS) tagging), and semantic (e.g., semantic-role labelling) pre-processing have all proven useful, when performing NER.

However, such pre-processing tends to be language-dependent and difficult to extend to new languages, since it requires (1) gazetteers or (2) large training data sets and sophisticated methods (e.g., clustering techniques such as brown clusters) to learn models to extract named entities automatically (e.g., using dependency trees). And for many languages, off-the-shelf (OTS) software to perform this pre-processing is not available.

Consequently, scalable multilingual NER remains an active area of research and experimentation.

SUMMARY

In an example embodiment, a processor-executed method is described. According to the method, software on a website serves a user of an online content-aggregation service a first article that the user views. The software extracts named entities from the first article using a named-entity recognizer. The named-entity recognizer uses a sequence of word embeddings as inputs to a conditional random field (CRF) tool to assign labels to each of the word embeddings. Each of the word embeddings is associated with a word in the first article and is trained using an entire topical article from a corpus of topical articles as a context for the word. The software then creates rankings for articles ingested by the content aggregation service based at least in part on the named entities and serves the user a second article using the rankings.

In another example embodiment, an apparatus is described, namely, computer-readable media which persistently store a program for a website hosting a content-aggregation service. The program serves a user of the online content-aggregation service a first article that the user views. The program extracts named entities from the first article using a named-entity recognizer. The named-entity recognizer uses a sequence of word embeddings as inputs to a conditional random field (CRF) tool to assign labels to each of the word embeddings. Each of the word embeddings is associated with a word in the first article and is trained using an entire topical article from a corpus of topical articles as a context for the word. The program then creates rankings for articles ingested by the content aggregation service based at least in part on the named entities and serves the user a second article using the rankings.

Another example embodiment also involves a processor-executed method. According to the method, software on a website serves a user of an online content-aggregation service a first article that the user views. The software extracts named entities from the first article using a named-entity recognizer. The named-entity recognizer uses a sequence of word vectors as inputs to a conditional random field (CRF) tool to assign labels to each of the word vectors. Each of the word vectors is associated with a word in the first article and is trained using an entire topical article from a corpus of topical articles as a context for the word. The named-entity recognizer does not use clustering. The software then creates rankings for articles ingested by the content aggregation service based at least in part on the named entities and serves the user a second article using the rankings.

BRIEF DESCRIPTION OF THE DRAWINGS

FIG. 3B depicts word vectors, in accordance with an example embodiment.

FIG. 6A is an example of a BILOU encoding, in accordance with an example embodiment.

FIG. 6B depicts alternative encodings, in accordance with an example embodiment.

DETAILED DESCRIPTION

Figure 1:
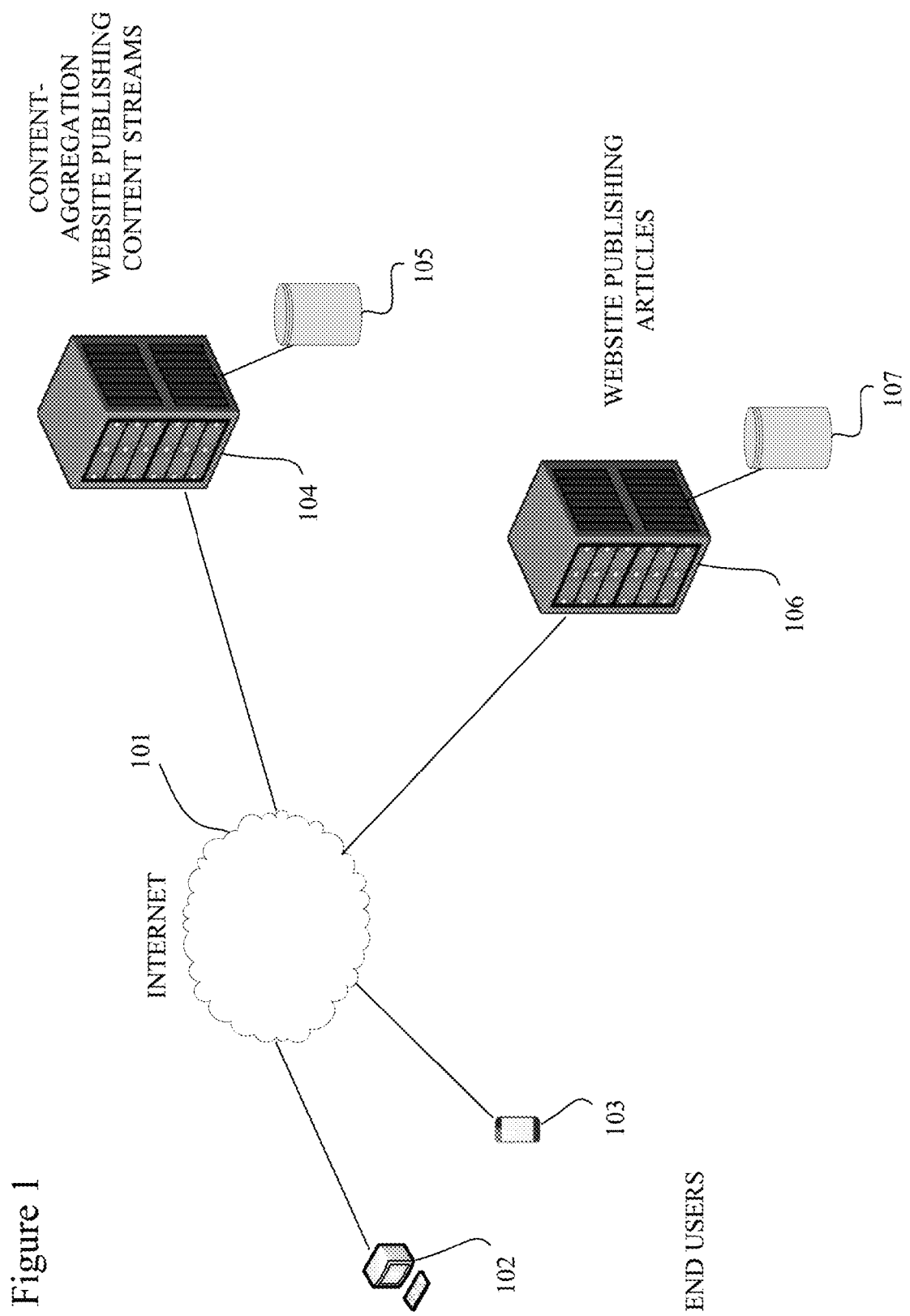
FIG. 1 is a network diagram showing a website hosting a content-aggregation service, in accordance with an example embodiment.

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an example embodiment" as used herein does not necessarily refer to the same embodiment and the phrase "in another example embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Named Entity Recognition (NER) is an essential part of document understanding in most of NLP pipelines. In most existing implementations, a high-performing NER system will use external sources of syntactic and semantic information. However, such information tends to be language-specific and/or expensive, in terms of human effort, to scale, maintain, and extend (e.g., gazetteers). The NER system described in this disclosure can extract named entities with minimal knowledge of a specific language and is thus a lightweight, scalable NER system which might be used with many languages.

FIG. 1 is a network diagram showing a website hosting a content-aggregation service, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which might be wireless in part or in whole) with a website 104 hosting a content-aggregation service that publishes a content stream and a website 106 hosting a publishing service (e.g., the website for the New York Times). Websites hosting a content-aggregation service, including websites hosting a social-networking service, often display content to a user using graphical user interface (GUI) functionality called a "content stream". Such websites determine inclusion or prominence of an item (e.g., an article) in the content stream based at least in part on a personalized user-interest profile which records the user's explicit and implicit relevance feedback as to previous items of content presented in the content stream. Explicit relevance feedback might take the form of user input to a GUI dialog inquiring about the user's interests. Implicit relevance feedback might include the viewing/listening history of the user, e.g., click-throughs and/or other measures of time spent (e.g., time spent viewing, time spent listening, time spent playing, etc.) by the user on categorized content. In an example embodiment, website 104 might be a website such as Yahoo! News or Google News, which ingests content from the Internet through "push" technology (e.g., a subscription to a web feed such as an RSS feed) and/or "pull" technology (e.g., web crawling), including articles (or Uniform Resource Locators (URLs) for articles) from website 106.

Alternatively, in an example embodiment, website 104 might host an online social network such as Facebook or Twitter. As used here and elsewhere in this disclosure, the term "online social network" is to be broadly interpreted to include, for example, any online service, including a social-media service, that allows its users to, among other things: (a) selectively access (e.g., according to a friend list, contact list, buddy list, social graph, interest graph, or other control list) content (e.g., text including web links, images, videos, animations, audio recordings, games and other software, etc.) associated with each other's profiles (e.g., Facebook walls, Flickr photo albums, Pinterest boards, etc.); (b) selectively (e.g., according to a friend list, contact list, buddy list, social graph, interest graph, distribution list, or other control list) broadcast content (e.g., text including web links, images, videos, animations, audio recordings, games and other software, etc.) to each other's newsfeeds (e.g., content/activity streams such as Facebook's News Feed, Twitter's Timeline, Google Plus's Stream, etc.); and/or (c) selectively communicate (e.g., according to a friend list, contact list, buddy list, social graph, interest graph, distribution list, or other control list) with each other (e.g., using a messaging protocol such as email, instant messaging, short message service (SMS), etc.).

And as used in this disclosure, the term "content-aggregation service" is to be broadly interpreted to include any online service, including a social-media service, that allows its users to, among other things, access and/or annotate (e.g., comment on) content (e.g., text including web links, images, videos, animations, audio recordings, games and other software, etc.) aggregated/ingested by the online service (e.g., using its own curators and/or its own algorithms) and/or posted by its users and presented in a "wall" view or "stream" view. It will be appreciated that a website hosting a content-aggregation service might have social features based on a friend list, contact list, buddy list, social graph, interest graph, distribution list, or other control list that is accessed over the network from a separate website hosting an online social network through an application programming interface (API) exposed by the separate website. Thus, for example, Yahoo! News might identify the content items in its newsfeed (e.g., as displayed on the front page of Yahoo! News) that has been viewed/read by a user's friends, as listed on a Facebook friend list that the user has authorized Yahoo! News to access.

In an example embodiment, websites 104 and 106 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Hadoop YARN, Pig, Hive, Dremel, CloudBase, etc. The servers in web site 104 might be connected to persistent storage 105 and the servers in website 106 might be connected to persistent storage 107. Persistent storages 105 and 107 might include flash memory, a redundant array of independent disks (RAID), and/or a storage area network (SAN), in an example embodiment. In an alternative example embodiment, the servers for websites 104 and 106 and/or the persistent storage in persistent storages 105 and 107 might be hosted wholly or partially in a public and/or private cloud, e.g., where the cloud resources serve as a platform-as-a-service (PaaS) or an infrastructure-as-a-service (IaaS).

Persistent storages 105 and 107 might be used to store content (e.g., text including articles, web links, images, videos, animations, audio recordings, games and other software, etc.) and/or its related data. Additionally, persistent storage 105 might be used to store data related to users and their social contacts (e.g., Facebook friends), as well as software including algorithms and other processes, as described in detail below, for ranking and presenting the content to the users in a content stream. In an example embodiment, the content stream might be ordered from top to bottom (a) in reverse chronology (e.g., latest in time on top), or (b) according to interestingness scores, including the rankings discussed below. In an example embodiment, some of the content (and/or its related data) might be stored in persistent storages 105 and 107 and might have been received from a content delivery or distribution network (CDN), e.g., Akami Technologies. Or, alternatively, some of the content (and/or its related data) might be delivered directly from the CDN to the personal computer 102 or the mobile device 103, without being stored in persistent storages 105 and 107.

Personal computer 102 and the servers at websites 104 and 106 might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family or the x86 family), volatile storage (e.g., RAM), and persistent storage (e.g., flash memory such as microSD), (2) an operating system (e.g., iOS, webOS, Windows Mobile, Android, Linux, Symbian OS, RIM BlackBerry OS, etc.) that runs on the hardware, and (3) one or more accelerometers, one or more gyroscopes, and a global positioning system (GPS) or other location-identifying type capability.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers to access content presented by websites 104 and 106. Alternatively, users of personal computer 102 and/or mobile device 103 might use other application programs (or apps, including hybrid apps that display HTML content) to access content presented by websites 104 and 106.

Figure 2A:
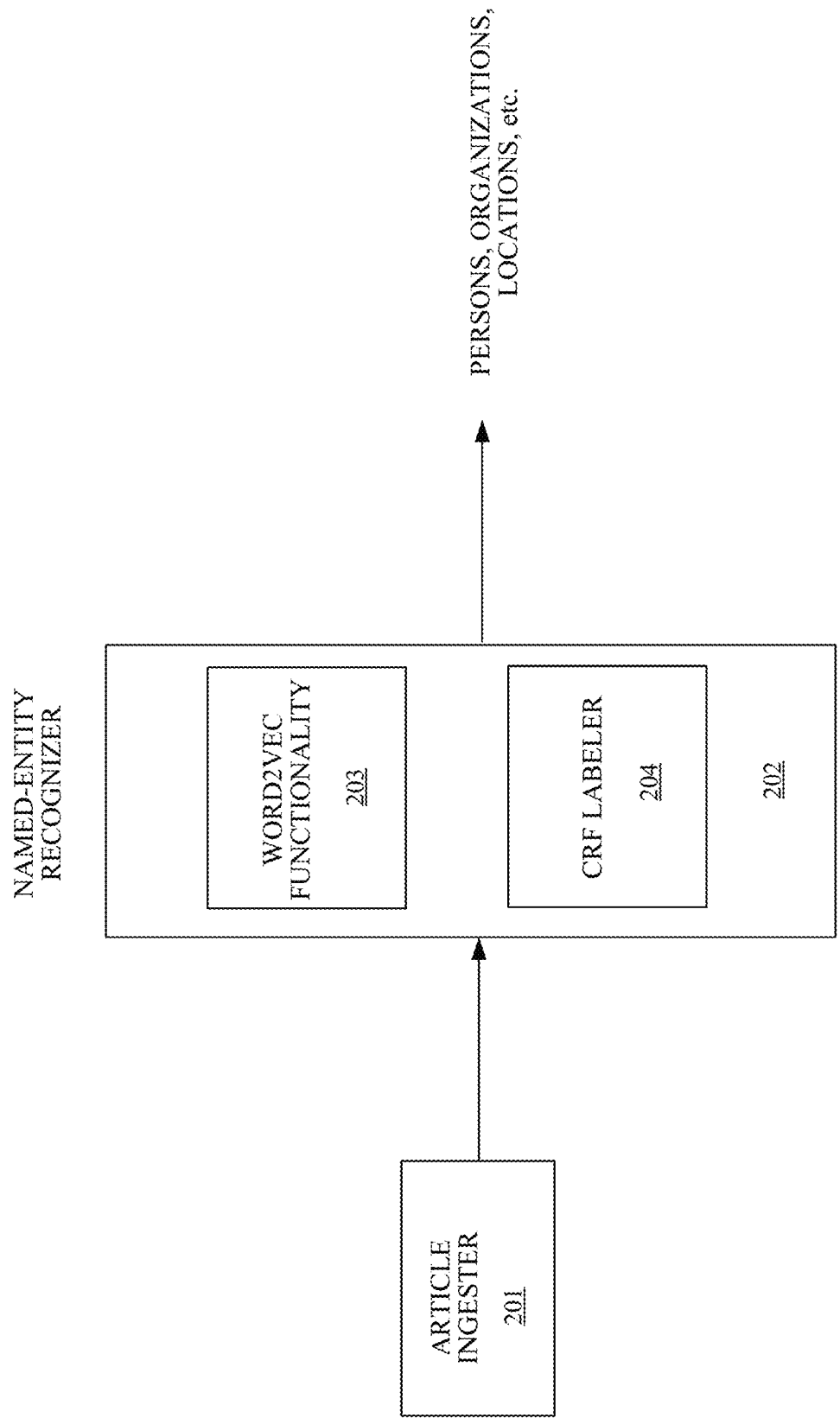
FIG. 2A is a diagram of a named-entity recognizer, in accordance with an example embodiment.
Figure 2B:
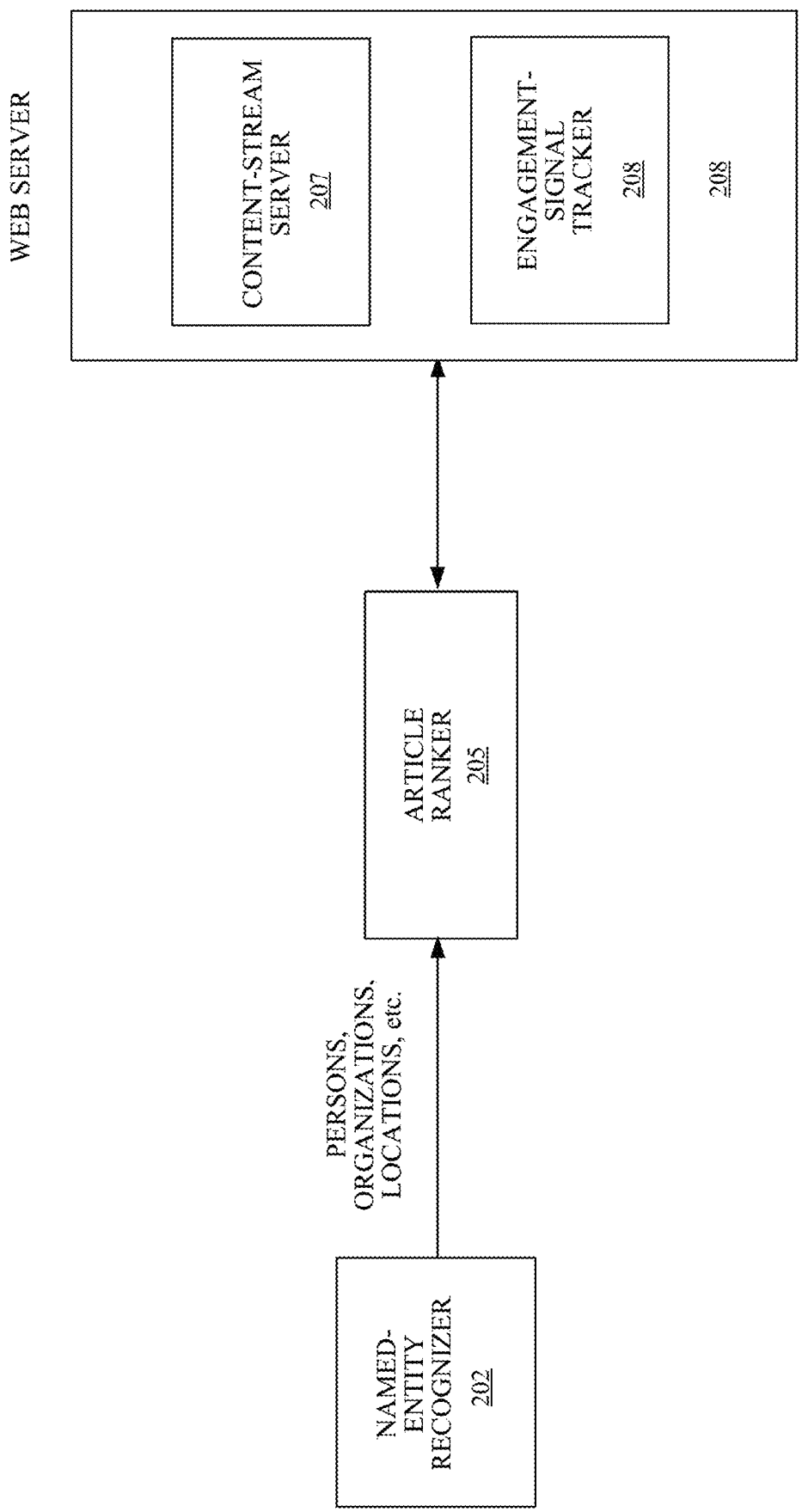
FIG. 2B is a diagram of an article ranker, in accordance with an example embodiment.

FIGS. 2A and 2B depict software modules at a content-aggregation website, in accordance with an example embodiment. In an example embodiment, the modules shown in these figures might be included in software running on servers at website 104 (e.g., Yahoo! News, Google News, Facebook, Twitter, etc.) using persistent storage 105. As depicted in FIG. 2A, article ingester 201 obtains an article over the Internet from a publishing service (e.g., website 106) using the "push" and/or "pull" technologies described above. Article ingester 201 then passes the article to a named-entity recognizer 202, which uses Word2Vec functionality 203 and CRF labeler 202 to extract named entities, such as persons, organizations, locations, etc., from the article.

As depicted in FIG. 2B, the named-entity recognizer 202 then passes the extracted named entities to an article ranker 205. The article ranker 205 ranks articles for inclusion and/or prominence of display in a user's content stream based in part on explicit and implicit relevance feedback from the user, as described above. So, for example, if a user has repeatedly clicked on articles in the user's content stream about "Steph Curry" (e.g., a named entity who is a person), the article ranker 205 might rank articles about "Steph Curry" relatively higher than articles about named entities that have received no clicks from the user. The article ranker 202 passes the article rankings to web server 206, which includes a content-stream server 207 and an engagement-signal tracker 208. The content-stream server 207 uses the article rankings to determine whether an article is included in a user's content stream, and, if so, how prominently, the article is displayed (e.g., relative to the top of the content stream) in the content stream. Engagement-signal tracker 208 monitors the user's interactions (e.g., implicit relevance feedback as described above) with the displayed articles and passes any interactions back to article ranker 205 for inclusion in the user's personalized user-interest profile.

Figure 3A:
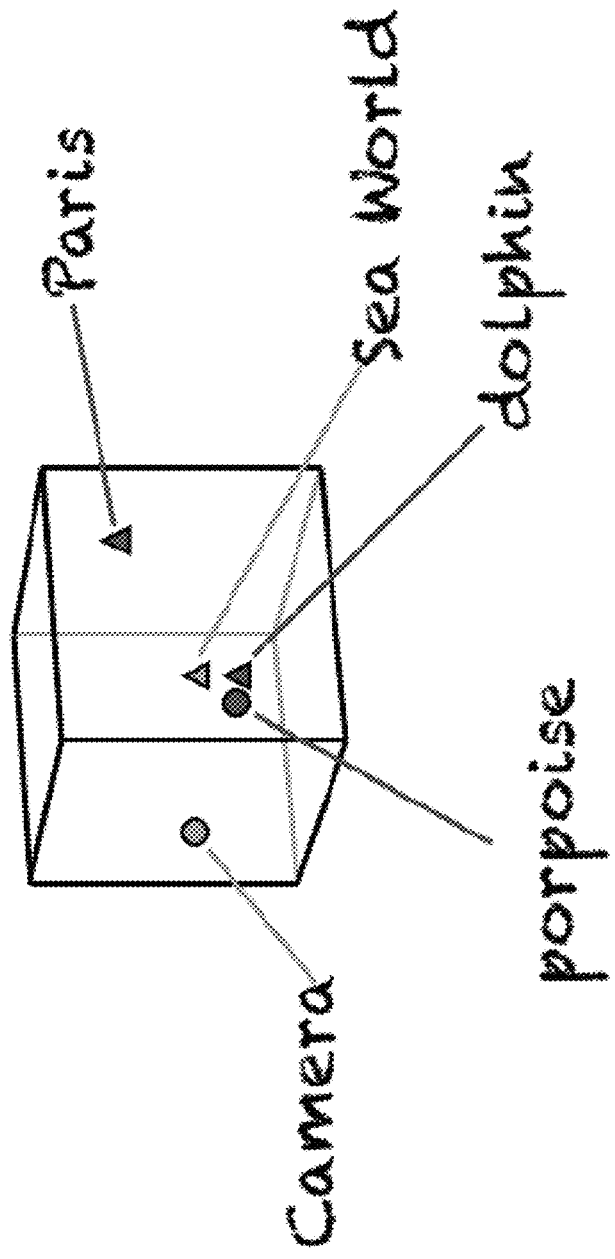
FIG. 3A depicts a word-vector space, in accordance with an example embodiment.

As used in this disclosure, "Word2Vec functionality" is to be broadly construed to mean a trained distributional-semantic model as described in Tomas Mikolov's "Distributional Representations of Words and Phrases and their Compositionality, Advances in Neural Information Processing Systems, 2013)[1] (hereafter "Distributional Semantics"), which is incorporated herein by reference. As noted there, in distributional semantics, meanings of particular words are represented as vectors or arrays of real values derived from frequency of their co-occurrences with other words (or other entities) in the training corpus. Words (or their "lemmas" as that term is used in morphology and lexicography) are vectors or points in multi-dimensional semantic space. Such a semantic space 301 is depicted in FIG. 3A, which is from "Distributional Semantics". The closeness or similarity of words in semantic space 301 is typically measured using cosine similarity. At the same time, words are also axes (dimensions) in this semantic space. Each word A is represented with the vector A. Vector dimensions or components are other words of the corpus' lexicon (B; C; D . . . N). Values of components are frequencies of words co-occurrences. In the simplest case, co-occurrences are just words occurring next to or near each other in text from the corpus. FIG. 3B from Distributional Semantics shows a symmetric word-word co-occurrence matrix 302. It will be appreciated that each row in this matrix is a trained "word vector" or "word embedding", as those terms are used in this disclosure.

[1] Downloadable here: http://papers.nips.cc/paper/5021-distributed-representations-of-words-and-phrases-and-their-compositionality.pdf.

Figure 4:
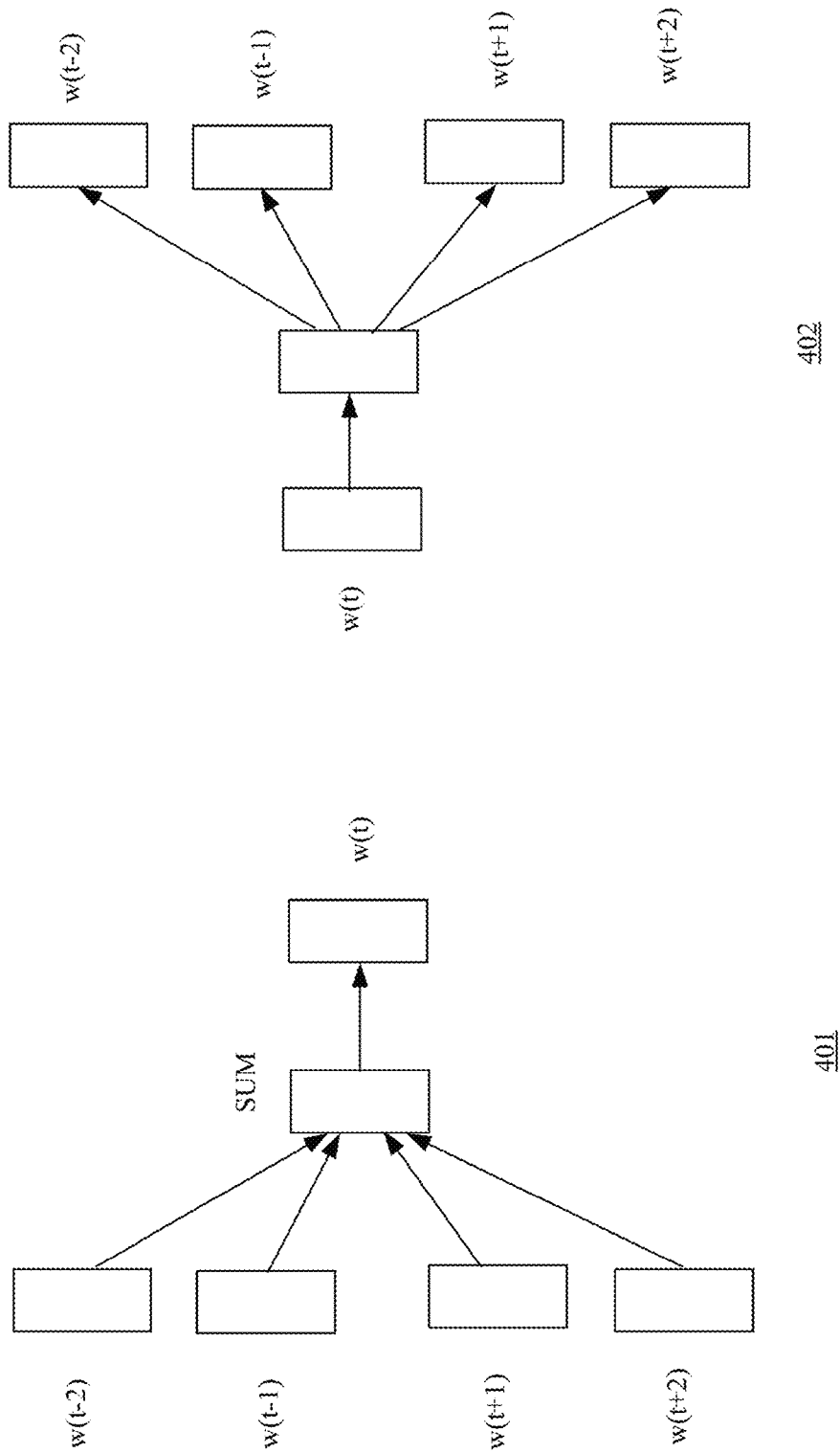
FIG. 4 depicts a continuous bag-of-words model and a continuous skip-gram model that form the basis for Word2Vec functionality, in accordance with an example embodiment.

In an example embodiment, Word2Vec functionality 203 might be open-source software, such as Word2Vec at Google Code, which is based on Mikolov et al., "Efficient Estimation of Word Representations in Vector Space" (Sep. 7, 2013) (hereafter "Mikolov"). Both the documentation for Word2Vec and Mikolov are incorporated herein by reference. As noted in that documentation, Word2Vec has two alternative models, e.g., a continuous bag-of-words (CBOW) model and a continuous skip-gram model. Diagram 401 in FIG. 4 illustrates the CBOW model, where a word (e.g., w(t)) is projected from an input context that consists of the words that precede (e.g., w(t−1)) and follow (e.g., w(t+1) the word, e.g. in a phrase or sentence. Diagram 402 in FIG. 4 illustrates the continuous skip-gram model, where the preceding (e.g., w(t−1)) and following contextual words (e.g., w(t+1) in a phrase or sentence are projected from an input word (e.g., w(t)).

It will be appreciated that Word2Vec functionality replaces the syntactic and semantic pre-processing that is language-specific as described above, e.g., part-of-speech (POS) tagging, dependency parsing, and semantic-role labelling. Consequently, the named-entity recognizer 202 depicted in FIGS. 2A and 2B is both scalable and multilingual.

CRF is an undirected graphical model that is often used to model NER as a sequence-prediction problem. Let $x=(x\_1, \ldots, x\_n)$ is an input sequence and $y=(y\_1, \ldots, y\_n)$ be the output sequence. The sequential-prediction problem is to estimate the probabilities $P(y\_i|x\_\{i-k\} \ldots x\_\{i+l\}, y\_\{i-m\} \ldots y\{i-l\})$, where k, l and m are small numbers to allow tractable inference and avoid overfitting to the training sequences which might lead to a prediction error when a novel input sequence is encountered. To solve the sequential-prediction problem, CRF estimates the conditional probability of values on output nodes (e.g., labels), given values assigned to input nodes (e.g., a sequence of words). In in the context of NER, CRF defines a conditional probability of a label sequence based on total probability over all possible label sequences.

In an example embodiment, CRF labeler 204 might (1) be trained with a set of named entities that were labeled by human labelers, and (2) use maximum-likelihood estimation to determine the labels for a sequence of words. Maximum-likelihood estimation is described in Lafferty et al., Conditional Random Fields: Probabilistic Models for Segmenting and Labeling Sequence Data, *Proc.* 18*th International Conf. on Machine Learning*, pp. 282-289 (2001), which is incorporated herein by reference.

In an example embodiment, named-entity recognizer 202 might also include functionality to perform part-of-speech (POS) tagging and/or morphological analysis involving word shape, capitalization, prefixes and suffixes (up to length of 4), numbers, and punctuations. Also, in an example embodiment, the named-entity recognizer 202 might not use clustering techniques (e.g., brown clusters).

Figure 5:
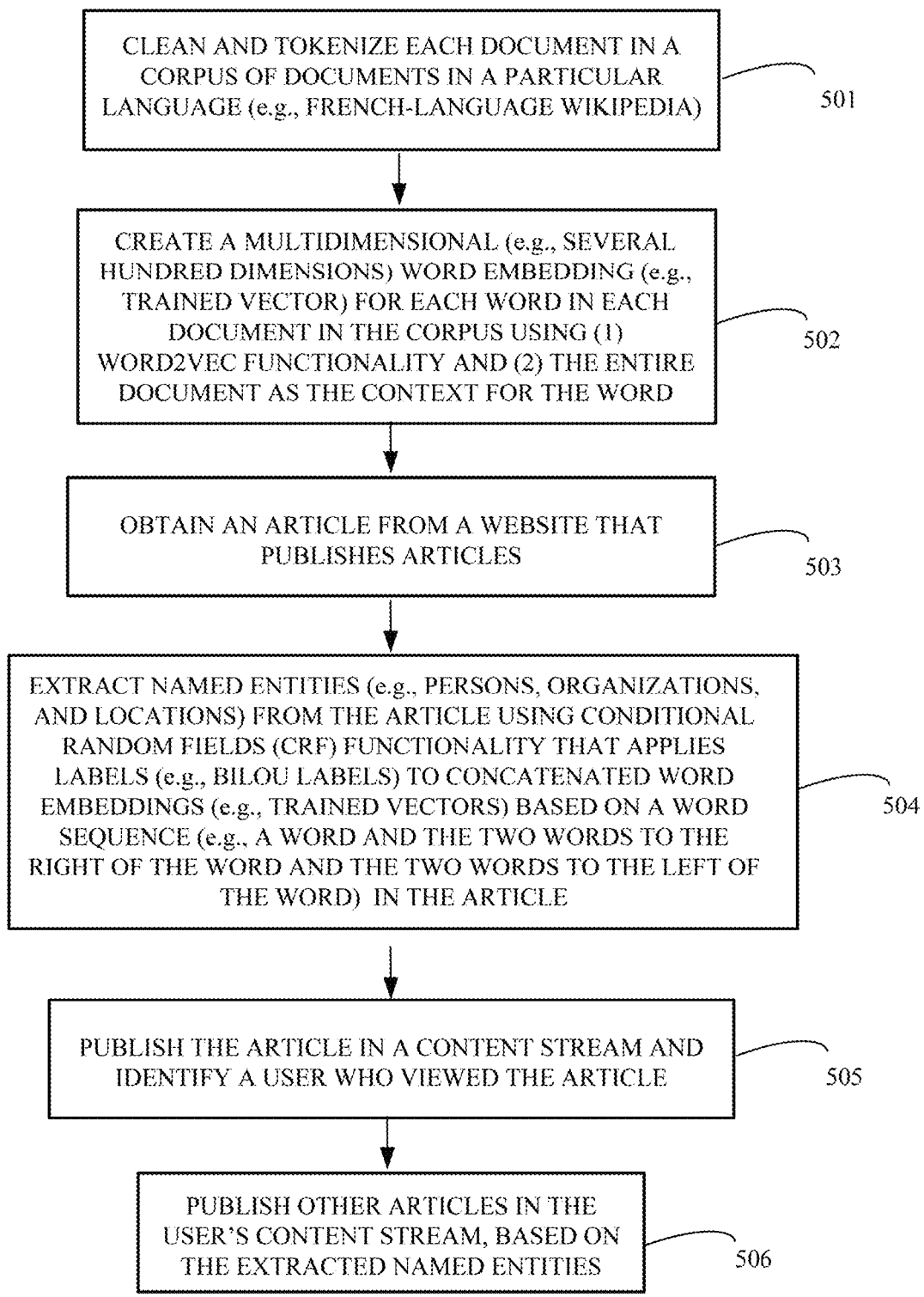
FIG. 5 is a flowchart diagram of a process for extracting named-entities from an article and using them to create a content stream, in accordance with an example embodiment.

FIG. 5 is a flowchart diagram of a process for extracting named-entities from an article and using them to create a content stream, in accordance with an example embodiment. In an example embodiment, the operations shown in this figure might be performed by software running on servers at website 104 (e.g., Yahoo! News, Google News, Facebook, Twitter, etc.) using persistent storage 105. In an alternative example embodiment, some of the operations shown in this figure might be performed by software (e.g., a client application including, for example, a webpage with embedded JavaScript or ActionScript) running on a client device (e.g., personal computer 102 or mobile device 103). It will be appreciated that these operations provide specifics for the general operations depicted in FIGS. 2A and 2B.

As depicted in FIG. 5, the software (e.g., the software running on servers at website 104) cleans and tokenizes each document in a corpus of documents in a particular language (e.g., French-language Wikipedia), in operation 501. In operation 502, the software creates a multidimensional (e.g., several hundred dimensions) word embedding (e.g., a trained vector) for each word in each document in the corpus using (1) Word2Vec functionality and (2) the entire document as the context for the word. In operation 503, the software obtains an article from a website that publishes articles. And in operation 504, the software extracts the named entities (persons, organizations, locations, etc.) from the article using conditional random fields (CRF) functionality that applies labels (e.g., BILOU labels) to concatenated word embeddings (e.g., trained vectors) based on a word sequence (e.g., a word and the two words to the right of the word and the two words to the left of the word) in the article. The software publishes the article in a content stream and identifies a user who viewed the article, in operation 505. Then in operation 506, the software publishes other articles in the user's content stream, based on the extracted named entities as described earlier with respect to FIG. 2B.

In an example embodiment, cleaning of each document in a corpus of documents in operation 501 might include removing HTML tags and other formatting, e.g., the formatting used by Wikipedia. Also, in an example embodiment, tokenization might include splitting sentences into words and/or sequences of words.

In an example embodiment, the Word2Vec functionality in operation 502 might be Word2Vec toolkit with the following parameters or options: (1) CBOW (continuous bag of words) model, which was described above; (2) 5 iterations; (3) window size of 5; and (4) no tuning on word analogy or development set. In an alternative example embodiment, other Word2Vec functionality might be used, e.g., gensim[2] word2vec or tensorflow[3] word2vec

[2]https://radimrehurek.com/gensim/models/word2vec.html
[3]https://www.tensorflow.org In an example embodiment, the CRF functionality in operation 503 might be CRFsuite with Limited Memory Broyden-Fletcher-Goldfarb-Shanno (L-BFGS). In another example embodiment, the CRF functionality might be CRF++ or MALLET.

In an example embodiment, the software depicted in FIG. 5 might not use either gazetteers or clustering techniques (e.g., brown clusters).

FIG. 6 shows an example of a BILOU encoding, in accordance with an example embodiment. It will be appreciated that BILOU is an acronym for Beginning-In-Last-Outside-Unique. In the example 601 in FIG. 6, the word sequence is a sentence: Justin Pierre James Trudeau is in Quebec City, the capital of Quebec. In an example embodiment, when this word sequence is input to the CRF functionality in operation 504, the CRF functionality labels: (1) "Justin" as the beginning word of a person entity (B_PER); (2) "Pierre" as being in a person entity (I_PER); (3) "James" as being in a person entity (I_PER); (4) "Trudeau" as being the last word in a person entity (L_PER); (5) "is" as being outside of an entity (O); (6) "in" as being outside of an entity (O); (7) "Quebec" as being the first word in a location entity (B_LOC); (8) "City" as being the last word in a location entity (L_LOC); (9) "," as being outside of an entity (O); (10) "the" as being outside of an entity (O); (11) "capital" as being outside of an entity (O); (12) "of" as being outside of an entity (O); (13) "Quebec" as being a unique location (U_LOC); and ".", as being outside of an entity (O). In an alternative example embodiment, another encoding might be used, e.g., IO, BIO, BMEWO, BMEWO+, etc. These other encodings are described in FIG. 6B.

Figure 7:
FIG. 7 is a content stream presented by a content-aggregation website, in accordance with an example embodiment.

FIG. 7 shows a content stream presented by a content-aggregation website, in accordance with an example embodiment. In an example embodiment, the content stream might be generated by the content stream server 207 in FIG. 2B. As depicted in FIG. 7, content stream 701 includes two full articles (702 and 703) arranged vertically in order of prominence from top to bottom in accordance with rankings (e.g., with the highest-ranking article at the top and the lowest-ranking article at the bottom) generated by article ranker 205. Content stream 701 also includes four thumbnail articles (704, 705, 706, and 707) arranged horizontally and an ad 708 labeled "Sponsored".

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising operations of:
    serve a user of an online content aggregation service a first article of a corpus of topical articles;
    responsive to the user viewing the first article, extracting named entities from the first article using a named-entity recognizer, wherein the named-entity recognizer is configured to use a trained distributional-semantic model process that trains on each word in the first article using an entire topical article from the corpus of topical articles as a context for the each word, and the training produces word embeddings that are provided as inputs to a conditional random field (CRF) tool to estimate a conditional probability of values on labels based upon values assigned to a word sequence in the first article and assign labels to concatenated ch of the word embeddings using BILOU (Beginning, In, Last, Outside, Unique) indicators based on the word sequence in the first article, wherein the assigning labels comprises labelling a first word of the word sequence as a beginning word of a person entity, labelling a second word of the word sequence as in the person entity, labelling a third word of the word sequence as a last word of the person entity, labelling a fourth word of the word sequence as outside of an entity, labelling a fifth word of the word sequence as a beginning word of a location entity, labelling a sixth word of the word sequence as a last word of the location entity, and labelling a seventh word as a unique entity, wherein the labeling is language independent and does not use gazetteers;
    determining that one or more content items have been viewed by one or more connections of the user on a social network;
    creating rankings for articles ingested by the online content aggregation service based at least in part on (i) the one or more content items that have been viewed by the one or more connections of the user and (ii) the named entities associated with the word embeddings having the labels that include one or more BILOU indicators;
    generating for the user a content stream, comprising a second article of the corpus of topical articles, based on the rankings; and
    serving the content stream to the user, wherein each of the operations is performed by one or more processors.

2. The method of claim 1, wherein the named-entity recognizer extracts one or more first named entities in a first language and one or more second entities in a second language.

3. The method of claim 1, wherein each of the word embeddings is a word vector.

4. The method of claim 1, wherein the trained distributional-semantic model process is a Word2Vec process used for generating each of the word embeddings.

5. The method of claim 1, wherein each named entity is a person, location, or organization.

6. The method of claim 1, wherein a sequence of the word embeddings is based on a contextual window that is an integer and that includes a sub-sequence of words to a left of a word in the first article and a sub-sequence of words to a right of the word in the first article.

7. The method of claim 1, wherein the corpus is in a particular language, and wherein selection of the corpus in the particular language enables use of the language independent labeling in the particular language.

8. One or more non-transitory computer-readable media persistently storing a program, wherein the program, when executed, instructs a processor to:
    serve a user of an online content aggregation service a first article of a corpus of topical articles;
    responsive to the user viewing the first article, extract named entities from the first article using a named-entity recognizer, wherein the named-entity recognizer uses a sequence of word embeddings as inputs to a conditional random field (CRF) tool to estimate a conditional probability of values on labels based upon values assigned to a word sequence in the first article and assign labels to concatenated word embeddings using BILOU (Beginning, In, Last, Outside, Unique) indicators based on the word sequence in the first article, wherein the labeling is language independent and does not use gazetteers, and wherein each of the word embeddings is associated with a word in the first article and is trained using an entire topical article from the corpus of topical articles as a context for the word, wherein the assigning labels comprises at least one of labelling a first word of the word sequence as a beginning word of a person entity, labelling a second word of the word sequence as in the person entity, labelling a third word of the word sequence as a last word of the person entity, labelling a fourth word of the word sequence as outside of an entity, labelling a fifth word of the word sequence as a beginning word of a location entity, labelling a sixth word of the word sequence as a last word of the location entity, or labelling a seventh word as a unique entity;

determine that one or more content items have been viewed by one or more connections of the user on a social network;

create rankings for articles ingested by the online content aggregation service based at least in part on (i) the one or more content items that have been viewed by the one or more connections of the user and (ii) the named entities associated with the sequence of word embeddings having the labels that include one or more BILOU indicators;

generate for the user a content stream, comprising a second article of the corpus of topical articles, based on the rankings; and serve the content stream to the user.

9. The non-transitory computer-readable media of claim 8, wherein the named-entity recognizer does not use clustering techniques.

10. The non-transitory computer-readable media of claim 8, wherein each of the word embeddings is a word vector.

11. The non-transitory computer-readable media of claim 8, wherein each of the word embeddings is generated using Word2Vec functionality that is a trained distributional-semantic model process.

12. The non-transitory computer-readable media of claim 8, wherein each named entity is a person, location, or organization.

13. The non-transitory computer-readable media of claim 8, wherein the sequence of word embeddings is based on a contextual window that is an integer and that includes a sub-sequence of words to the left of a word in the first article and a sub-sequence of words to the right of the word in the first article.

14. The non-transitory computer-readable media of claim 8, wherein the corpus is an online encyclopedia in a particular language, and wherein selection of the corpus in the particular language enables use of the language independent labeling in the particular language.

15. A method, comprising operations of:
serving a user of an online content aggregation service a first article of a corpus of topical articles;

responsive to the user viewing the first article, extracting named entities from the first article using a named-entity recognizer, wherein the named-entity recognizer uses a sequence of word vectors as inputs to a conditional random field (CRF) tool to estimate a conditional probability of values on labels based upon values assigned to a word sequence in the first article and assign labels to concatenated word vectors using BILOU (Beginning, In, Last, Outside, Unique) indicators based on the word sequence in the first article, wherein each of the word vectors is associated with a word in the first article and is trained using an entire topical article from the corpus of topical articles as a context for the word;

determining that one or more content items have been viewed by one or more connections of the user on a social network;

creating rankings for articles ingested by the online content aggregation service based at least in part on (i) the one or more content items that have been viewed by the one or more connections of the user and (ii) the named entities associated with the sequence of word vectors having the labels that include one or more BILOU indicators;

generating for the user a content stream, comprising a second article of the corpus of topical articles, based on the rankings; and serving the content stream to the user, wherein each of the operations is performed by one or more processors;

wherein the sequence of word vectors is based on a contextual window that is an integer and that includes a sub-sequence of words to a left of a word in the first article and a sub-sequence of words to a right of the word in the first article.

16. The method of claim 15, wherein the corpus is in a particular language.

17. The method of claim 15, wherein the corpus is in a particular language, and wherein selection of the corpus in the particular language enables use of the language independent labeling in the particular language.

* * * * *